(12) United States Patent
Mitchell

(10) Patent No.: US 8,409,321 B2
(45) Date of Patent: Apr. 2, 2013

(54) METHOD AND APPARATUS FOR LEACHING METAL FROM MINING ORE

(75) Inventor: William S. Mitchell, McKenzie, TN (US)

(73) Assignee: Tekni-Plex, Inc., King of Prussia, PA (US)

( * ) Notice: Subject to any disclaimer, the term of this patent is extended or adjusted under 35 U.S.C. 154(b) by 162 days.

(21) Appl. No.: 12/960,750

(22) Filed: Dec. 6, 2010

(65) Prior Publication Data

US 2012/0137831 A1  Jun. 7, 2012

(51) Int. Cl.
C22B 3/04 (2006.01)

(52) U.S. Cl. ............................................. 75/712; 75/743

(58) Field of Classification Search ................ 75/712, 75/743

See application file for complete search history.

(56) References Cited

U.S. PATENT DOCUMENTS

| | | | |
|---|---|---|---|
| 2,807,505 A | 7/1956 | Weitzel | |
| 4,301,121 A * | 11/1981 | Von Kohorn | 423/1 |
| 4,739,973 A * | 4/1988 | Herndon | 266/101 |
| 4,958,770 A | 9/1990 | Mitchell | |
| 5,030,279 A * | 7/1991 | Krauth | 75/712 |
| 5,336,474 A * | 8/1994 | Diehl et al. | 423/29 |
| 5,368,235 A | 11/1994 | Drozdoff et al. | |
| 5,811,038 A | 9/1998 | Mitchell | |
| 5,811,164 A * | 9/1998 | Mitchell | 428/36.5 |
| 5,816,742 A * | 10/1998 | Cordewener | 405/43 |
| 6,053,964 A | 4/2000 | Harrell | |
| 8,186,607 B2 * | 5/2012 | Guzman et al. | 239/101 |
| 2008/0000823 A1 | 1/2008 | Mitchell et al. | |
| 2009/0230207 A1 | 9/2009 | Guzman et al. | |

OTHER PUBLICATIONS http://www.pvc.org/en/p/pvcs-physical-properties PVC. "PVC's Physical Properties". Downloaded Jul. 5, 2012.*
Derwent Acc No. 2002-464012 for Nie et al. Patent family CN 1181308 A, published May 13, 1998.*
Nie et al. CN 1181308 A, published May 13, 1998. Machine translation.*
Mar. 12, 2012 International Search Report and Written Opinion in PCT/US2011/063355.

* cited by examiner

Primary Examiner — George Wyszomierski
Assistant Examiner — Tima M McGuthry Banks
(74) Attorney, Agent, or Firm — Novak Druce Connolly Bove & Quigg LLP

(57) ABSTRACT

Porous leach pipe and method for leaching metals from mining ores. The porous pipe may be buried beneath the surface of a pile of mined ore, providing a more even and uniform distribution of the leaching solution across the pile, increasing metal yields, reducing water consumption and eliminating pooling and ponding of the solution on the top of the piles as occurs with prior art drip line emitters.

20 Claims, 5 Drawing Sheets

METHOD AND APPARATUS FOR LEACHING METAL FROM MINING ORE

The present invention relates to a method and apparatus for leaching metal from a pile of mining ore, which method and apparatus delivers a leaching solution more uniformly across the pile thereby increasing metal yields, reducing water consumption and reducing environmental concerns.

BACKGROUND

Copper, gold and other mined ores are blasted or crushed into small chunks and placed directly into large heaps where the ore can be irrigated with a leach solution of, e.g, sodium cyanide (NaCN), potassium cyanide (KCN), or sulphuric acid ($H_2SO_4$), applied to the pile. The solution percolates through the heap, bonds to particles of metals such as gold or copper, and the leach solution is then captured (e.g., by an impermeable plastic or clay-lined leach pad at the bottom of the pile) and processed into pure metal. The leach process through a pile typically takes several weeks. Once the metals are removed, the leach solution is recycled and used again on the pile to leach more metal.

In the past, large irrigation sprinklers have been used to deliver the leach solution to the pile. This practice is rarely seen today because of the tremendous amount of water loss (e.g., evaporation and runoff) with this method.

More traditionally, the leaching solution is delivered to the piles using drip irrigation, i.e., nonporous tubing with drip emitters molded into the tubing at spaced intervals (most often at 28 inch intervals), the irrigation system being laid out across the surface of the pile. Based on their flow characteristics and periodic placement along the line, drip emitters cause a phenomenon known as channeling in the ore. Channeling occurs where a large amount of solution is dripped in one spot over time. This spot quickly saturates and the solution then channels into a relatively narrow stream, traveling quickly down through the pile as the solution seeks the path of least resistance to the bottom of the pile. Channeling produces a very uneven distribution of the leaching solution in the pile, with some areas extremely wet and others dry. Gold and copper are only leached from ore that makes direct and extended contact with the leach solution, and therefore in piles using drip emitters there are areas between the channels that do not get adequate leaching and metal removal.

Still further, because drip irrigation applies the solution to the surface of the pile, and because a large volume of solution is dripped onto a select spot, drip emitters cause pooling and ponding of the leach solution on the top surface of the ore pile. Both sodium cyanide and sulphuric acid can be toxic to wild life. In various jurisdictions, there is a major push for all leach lines to be buried because of the negative environmental impact of surface drip irrigation. While burying drip irrigation is possible, when buried the emitters tend to clog, further reducing the efficiency of the leaching process and greatly increasing the amount of labor required to keep them in operation.

FIG. 1 illustrates the problems encountered with burying a standard drip line emitter below the surface of the pile. FIG. 1 is a schematic cross section of a leach pile 5 showing a drip line 7 buried 6 to 18 inches below the top surface 6 of the pile. The emitters 8 are shown in cross section, disposed every 28 inches across a section of the pile. For ease of illustration, only a small section of the pile is shown, it being understood that a typical pile may range from 300 by 300 feet in cross sectional area, increasing up to 1000 by 1000 feet in cross sectional area, with a starting height of 40 feet, and increasing over time to 1000 or more feet high. Thus, these piles of ore are truly enormous and their very large scale must be taken into consideration in understanding the problems addressed by the present invention.

On the left hand side of FIG. 1, a standard drip line 7 is shown buried beneath the surface of a leach pile having a relatively low clay content (i.e., less compacted than a high clay content pile). Although the leach solution 9 can quickly saturate the area below each of the individual emitters 8, spanning out in the process, there are still large areas between the emitters where the amount of leaching solution is deficient, reducing the efficiency of the process. Still further, when leach emitters are buried, the emitters quickly clog with particles of ore, sand or soil, further reducing the efficiency of the leaching process and greatly increasing the amount of labor required to keep them in operation.

On the right hand side of FIG. 1, a standard drip line 7 is shown buried beneath the surface of a leach pile having a high clay content, or otherwise compacted. Here the problems are even greater. The point source delivery of the solution is not absorbed quickly by the pile due to its high density, and so the solution flows along the drip line 7, concentrates, and rises to the surface 6 of the pile forming a pool 9; it also discharges from the side 11 of the pile. The pooling of leach solution on the surface leads to evaporation losses and potential injury to wildlife.

As a result of these multiple problems with buried drip lines, the vast majority of users continue to lay the drip line emitters on the top surface of the pile. It is both easier and cheaper, avoiding the expense of burying the drip line, avoiding the emitters being crushed or damaged by the process of burying them under the ore, and reducing the likelihood that the emitters will become clogged by the particles in the ore pile.

There has long been a need for improvements in the current methods for delivering a leaching solution to a pile of mining ore in an efficient and cost effective manner. Despite such long felt need, there have been little changes in the process over the past decades.

SUMMARY OF THE INVENTION

According to the present invention, a new mining leach pipe is provided designed to evenly deliver a leach solution at a controlled rate (e.g., 1 gallon per 100 feet per minute) over extended distances in the range of e.g, 150 to 300 feet. The pipe is designed to be buried beneath the surface of a leach pile to achieve significantly higher metal yields while avoiding the channeling and environmental concerns associated with the pooling/ponding of the prior art. Still further, due to the labyrinth of channels provided throughout the length of this porous pipe, the rate of clogging is dramatically reduced.

Thus, the present invention provides one or more of the following advantages:

- uniform leak rates over long runs of tubing;
- crush resistant wall that allows the pipe to be mechanically installed using heavy equipment, and allows it to be buried in rock/ore without crushing;
- dramatic reduction in water consumption and runoff when compared to surface drip emitters, as burying the leach pipe significantly reduces evaporation associated with the pooling/ponding of the prior art;
- higher metal yields from the leach solution due to the more uniform wetting of the pile by the new porous leach pipe;
- elimination of the environmental hazards associated with the pooling and ponding of the leaching solution according to the prior art.

In accordance with one embodiment of the invention, a method of leaching metal from a pile of mining ore is provided comprising:

locating a leach pipe below the surface of the pile;

supplying a leach solution to an inlet end of the pipe to pressurize the pipe with the leach solution; and the leach pipe comprising a flexible microporous tubular wall of select length providing a substantially continuous and consistent delivery rate of the leach solution along such length as the solution seeps through the microporous wall of the pressurized pipe.

In accordance with another embodiment of the invention, an apparatus is provided for leaching metal from mining ore comprising a microporous leach pipe adapted to be buried beneath a surface of a pile of mining ore, the microporous leach pipe comprising a flexible microporous tubular wall of rubber or plastic material having a porous sponge-like structure with a multiplicity of interconnected irregular shaped pores such that a leach solution under pressure in the pipe will seep through the wall at a rate of from 0.5 to 2.0 gallons per 100 feet per minute.

In one embodiment, the microporous wall has a pore size in a range of from 0.001 to 0.004 inch.

In one or more embodiments, the length of the microporous wall is at least 100 feet, from 100 to 300 feet, or from 300 to 600 feet.

In one or more embodiments, the microporous wall has a wall thickness of at least 0.05 inches, from 0.05 to 0.5 inch, or from 0.1 to 1 inch.

In one or more embodiments, the microporous wall has an inner diameter of at least 0.25 inch from 0.25 to 1 inch, or from 0.5 to 0.75 inch.

In one embodiment, the micorporous wall comprises a wall of rubber or plastic material having a porous sponge-like structure with a multiplicity of interconnected irregular shaped pores such a leach solution under pressure in the pipe will seep through the wall at a rate of from 0.5 to 2.0 gallons per 100 feet per minute.

In one embodiment, the leach solution comprises sodium cyanide, potassium cyanide or sulphuric acid and optionally includes a pH buffer (e.g., a salt, a caustic metallic base such as sodium hydroxide).

In one or more embodiments, the delivery rate is at least 0.5 gallons per 100 feet per minute, from 0.5 to 2.0 gallons per 100 feet per minute, from 0.8 to 1.5 gallons per 100 feet per minute, or from 0.9 to 1.1 gallons per 100 feet per minute.

In one or more embodiments, the delivery rate is at least 0.005 gallons per foot per minute, from 0.005 to 0.02 gallons per foot per minute, or from 0.008 to 0.015 gallons per foot per minute.

In one or more embodiments, the pressure is at least 8 psi at the inlet end of the leach pipe, at least 10 psi, from 15 to 80 psi, or from 20 to 50 psi.

In one or more embodiments, the pressure drop along the length of the leach pipe is from 10-60% per 100 feet, 2-3 psi per 100 feet, or 8-12 psi per 100 feet.

In one or more embodiments, the leach solution is delivered for at least 45 days while maintaining a delivery rate of at least 0.5 gallons per 100 feet per minute.

In one or more embodiments, wherein the metal comprises at least one of gold, copper and chromium.

In one or more embodiments, the wall comprises thermoset polymer particles and a thermoplastic binder.

In one or more embodiments, the particles comprise rubber, natural or synthetic rubber, reclaimed rubber, or cured crushed rubber.

In one or more embodiments, the rubber particles comprise at least 50 weight percent of the pipe, from 50 to 80 weight percent, or from 60 to 70 weight percent.

In one or more embodiments, the binder comprises an ethylene polymer, polyethylene, or low density polyethylene.

In one or more embodiments, the rubber particles have a fineness of about 5 to 200 mesh, about 10 to 100 mesh, or about 30 to 50 mesh.

In one or more embodiments, the fluid delivery rate varies by no greater than 10% per two foot section of a 100 foot microporous wall length, or no greater than 5% per two foot section of a 100 foot microporous wall length.

In one or more embodiments, the microporous wall has a pore size in a range of from 0.001 to 0.004 inch, a wall thickness of from 0.05 to 0.5 inch, an inner diameter of from 0.25 to 1 inch, and a length of at least 100 feet.

DETAILED DESCRIPTION

Figure 1:
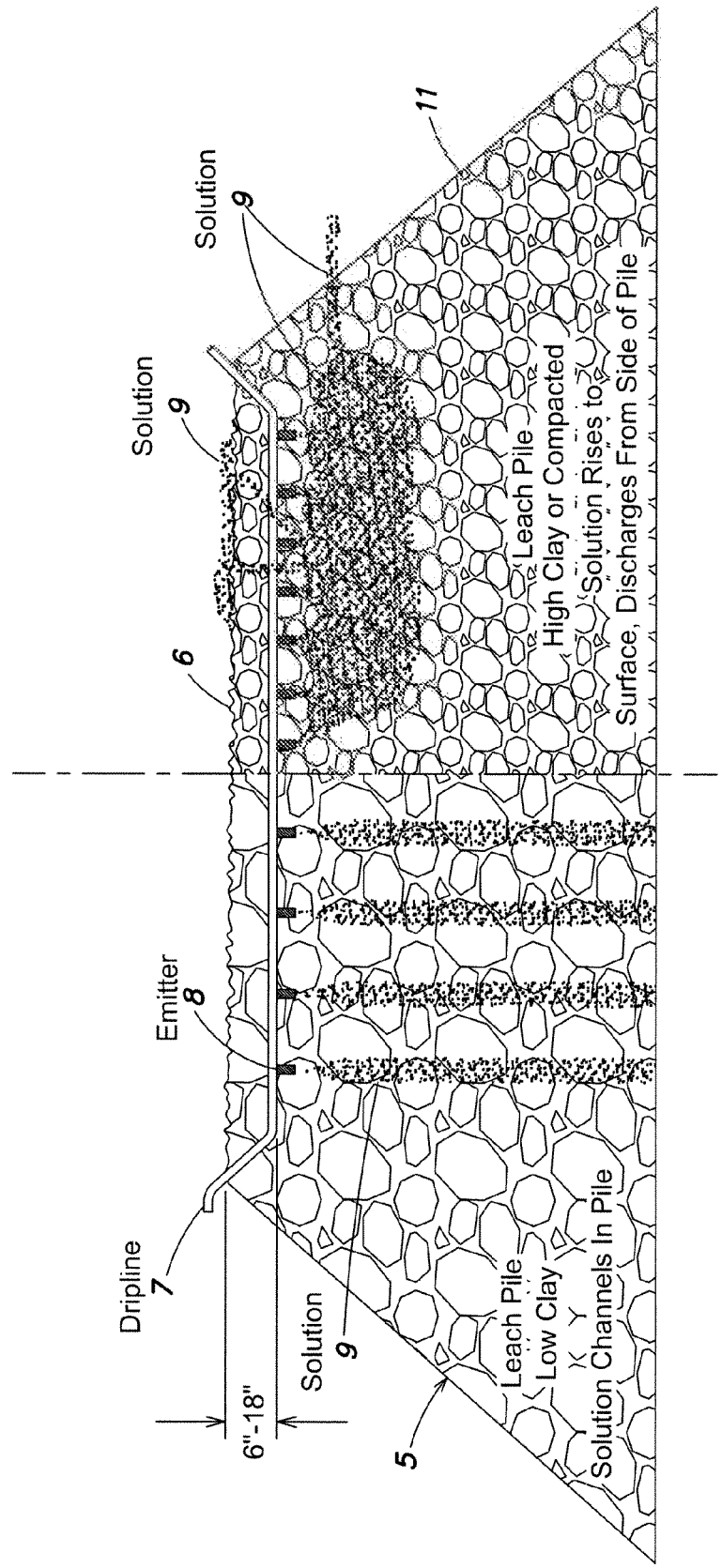
FIG. 1 is a schematic illustration of a prior art drip line emitter, and the problems associated with such drip line emitters if they are buried beneath the surface of the pile.
Figure 2:
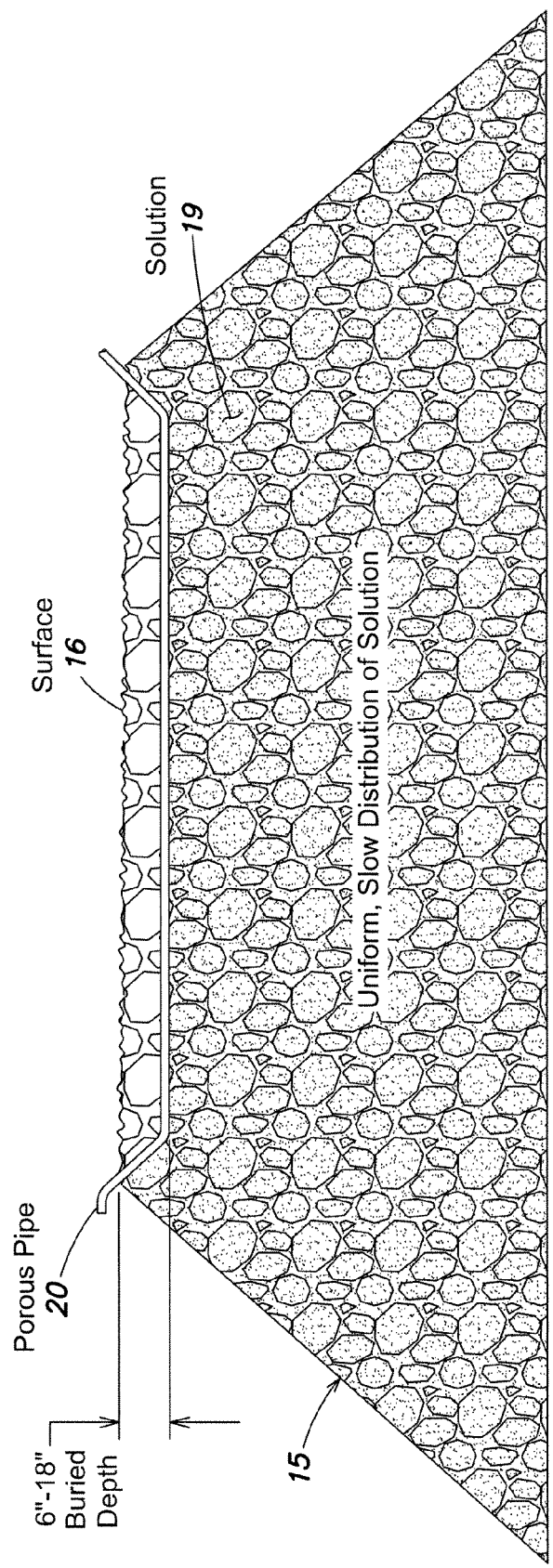
FIG. 2 is a schematic illustration of one embodiment of a porous leach pipe of the present invention, shown buried beneath the surface of a pile of mining ore, illustrating the dramatically greater distribution and efficiency of the delivery process.

FIG. 2 is a schematic representation of one embodiment of the invention in use, showing a porous mining leach pipe 20 buried (e.g., 6 inches to 18 inches) below the surface 16 of a pile 15 of mining ore. The porous pipe, as described further below, provides a uniform and slow distribution of leaching solution 19 along the length of the pipe. The leaching solution seeps through a microporous wall and wets the outer surface of the pipe, in contrast to the dripping action of the prior art drip line emitters. The seeping action more effectively soaks the adjacent earth in the mining pile, avoids pooling and increases the proportion of the ore in the pile that is in contact with (wetted by) the leaching solution over an extended period of time—a necessary component of an effective and high volume leaching process. The pipe is designed to withstand the burying process, as well as the weight of the ore piled on top of the pipe. Still further, the microporous structure of the pipe resists clogging when buried, enabling the pipe to be used more cost effectively and for extensively longer periods of time than the prior art drip emitters.

In one embodiment, the mining leach pipe is designed to evenly leak water (leach solution) at a controlled delivery rate of approximately 1 gallon per 100 feet per minute, substantially uniformly across distances of between 150 and 300 feet.

The porous pipe is crush resistant, with a preferred wall thickness in a range of 0.05 to 0.5 inch. The inner diameter can range from 0.25 to 1 inch. The combination of uniform delivery over long runs and slow seepage allows the leach pipe to achieve significantly higher metal yields from the pile, avoiding channeling, while also eliminating the environmental and water loss/evaporation problems with pooling/ponding. Also, by maintaining a continuous porous passageway and substantially consistent pore size (e.g., in a range of from 0.001 to 0.004 inches) across the full length of the tubing, the rate of clogging is dramatically reduced. The porous mining pipe has a labyrinth of channels throughout its length which has been found to avoid the adverse clogging effects of the prior art emitters (e.g., due to pH buffers in the leach solution, e.g., sodium hydroxide, and/or due to the earth/ore itself e.g., calcium carbonate).

In one embodiment, the porous pipe comprises thermoset polymer particles and a thermoplastic binder for binding the particles into a composite structure with a substantial volume of void space (the microporous channels). The pipe may be formed as an extrudable mixture in which a major portion comprises the thermoset polymer particles and a minor portion the thermoplastic binder. No further constituents are required; however it may be desirable to include small amounts of slip agents or lubricants depending upon the process parameters. Examples of suitable thermoset polymer particles include natural or synthetic rubber. Cured crumb rubber reclaimed from the tread portions of vehicle tires, is readily available and an inexpensive source of the major component. The rubber may be ground into crumb like particles which are of a mesh size of about 5 to 200 mesh, more specifically about 10 mesh to 100 mesh, and still more specifically about 30 to 50 mesh.

The binder component may be a thermoplastic resin material such as polyethylene (PE), and more particularly a linear low density polyethylene resin capable of thermal softening below about 300 degrees F., for extrusion processing with the crumb rubber particles in an extruder die that operates at a temperature ranging from about 350 to 365 degrees F. Other binders may be used, however PE is preferred since it is generally unreactive in rock and soil environments over long-term use, and to various chemicals that may be used in the leaching solution. Linear low density polyethylene's are known having a density ranging from about 0.90 to 0.93 gram per cubic centimeter, and porous pipe made from such binder resin is flexible and can be bent to desired configurations and contours. Polyethylene may be employed in the form of granules or particles having a fineness of about 40 mesh (0.0185 inch) to 0.125 inch.

The mixture may comprise about 50% to 80% by weight thermoset (e.g., crumb rubber) particles and about 50% to 20% by weight thermoplastic (e.g. polyethylene) binder resin, a particular embodiment being about 66% rubber particles and 34% polyethylene binder. Other particle sizes and weight percentages can be used depending on the porosity desired, the thickness, diameter and length of the pipe, the leaching solution, the composition of the ore pile and other variables of the intended application. In one embodiment of a leach pipe made from rubber particles and polyethylene binder, the pipe has a wall thickness in range of 0.0625 to 1.9375 inch, with 0.125 being suitable for many applications. The outside diameter can range from 0.25 to 2.0 inch with 0.84 being preferred, and a wall thickness of 0.05 to 0.25 inch.

Typically, the thermoset particles and binder are intimately mixed prior to their introduction to the extruder, or may be delivered to the extruder through separate component hoppers. The components are mixed and heated within the extruder and passed therethrough by, e.g., a single screw having a continuous spiral flight. The mixture is thermally processed together, the binder being thermally softened and the crumb rubber particles remaining as discrete individual unmelted irregularly-shaped crumb particles. The particles are coated in part by the binder during the mixing action of the extruder apparatus. The porous pipe may be formed into a variety of sizes depending on its intended use. For example, the pipe may range from about 0.25 to 1 inch in internal diameter, with a wall thickness of about 0.03 to 0.5 inch. Optimally, the porous pipe exhibits a substantially uniform rate of delivery of the leaching solution along its length, preferably varying by no greater than 10% along each two foot section of a 100 foot microporous wall, and more preferably no greater than 5%.

A suitable extrusion apparatus for making a microporous leach pipe of crumb rubber particles and polyethylene according to one embodiment of the invention, is described in one or more of U.S. Pat. Nos. 5,811,038, 4,958,770, and 5,811,164.

In an alternative embodiment, the porous leach pipe may be made of a more uniform polymer composition, such as a foamed polymer. In one example, the foamed polymer is a polyvinyl polymer adapted to provide both flexibility and a suitable microporous structure. The pores may be formed with blowing agents, either chemical, thermal or physical agents. The porous flexible pipe can by extruded of any suitable plastic material containing a blowing agent under required conditions of temperature and pressure to force the heated plastic mass through a suitable tubular shaping extrusion nozzle, and to cause the blowing agent to expand when the mass leaves the nozzle or extrusion die to bring about an expansion of the plastic mass with the formation of a porous, sponge-like structure.

Thus, a wide variety of plastic materials can be used in forming the microporous leach pipe. Plastic materials such as polyethylene, polyester resins, flexible forms of nylon, polyurethane resins or the like may be employed. A desirable combination of pipe flexibility, mechanical strength, and weather and corrosion resistance can be obtained using flexible formulations of vinyl plastics, especially plasticized vinyl chloride polymers. Flexible grades of polyethylene and nylon, may be shaped into suitable tubing without use of plasticizers.

When vinyl polymers (and/or most other usable plastics) are employed to form a foamed porous tubing, it is necessary to add a blowing agent as previously described. However, in the case of polyurethane and other materials, the addition of a blowing agent may be unnecessary, expansion of the plastic being obtained by formation in situ of an expansion agent during the fabrication process. Where a blowing agent is employed, a number of different materials may be used. For example, an organic blowing agent, e. g., dinitroso pentamethylene tetramine, or an inorganic blowing agent such as sodium bicarbonate, ammonium carbonate, ammonium bicarbonate or ammonium sesquicarbonate. The blowing agent is usually employed in about 0.5-10% by weight of the plastic mass, the exact amount being governed by the density desired in the final tubing, and this, in turn, being controlled to some extent by the plastic and amount of plasticizer used.

Thus, the apparatus of the present invention comprises long tubular members having walls made of plastic or rubber material in the form of a porous sponge-like structure which contain a multiplicity of interconnected irregular shaped pores of such size, distribution and degree of interconnection that water (leach solution) under pressure within the pipe will slowly seep through the pipe and spread out on the surface of the pipe, so as to gradually and gently soak the adjacent areas of the ore pile in which it is buried.

By providing a plurality of elongated pores, whose major axis is at an acute angle to the longitudinal axis of the pipe, the outer surface and pores cooperate to give an extended surface distribution of the liquid dispensed through the pipe, in contrast to concentrated needle stream flow of water from drip line emitters. In performing the extrusion, the quantity and size of the ingredients is controlled relative to the extrusion conditions, e.g., temperature, pressure and speed of extrusion, to create walls in the tubing having a sponge-like structure of interconnected pores that create a high resistance to any high velocity flow of the leaching solution therethrough, but still enable a substantial amount of solution to pass per unit time. The extruded tubing is then cut into lengths as desired, to form a porous leach pipe. A suitable coupling device is fixed to one end of the pipe (typically done in the field) to enable the pipe to be connected to a source (e.g., supply pipe) of leaching solution under pressure. In one embodiment, the distal end of the tube is closed by a cap or the like, or by fusing together the walls of the tube.

Figure 3:
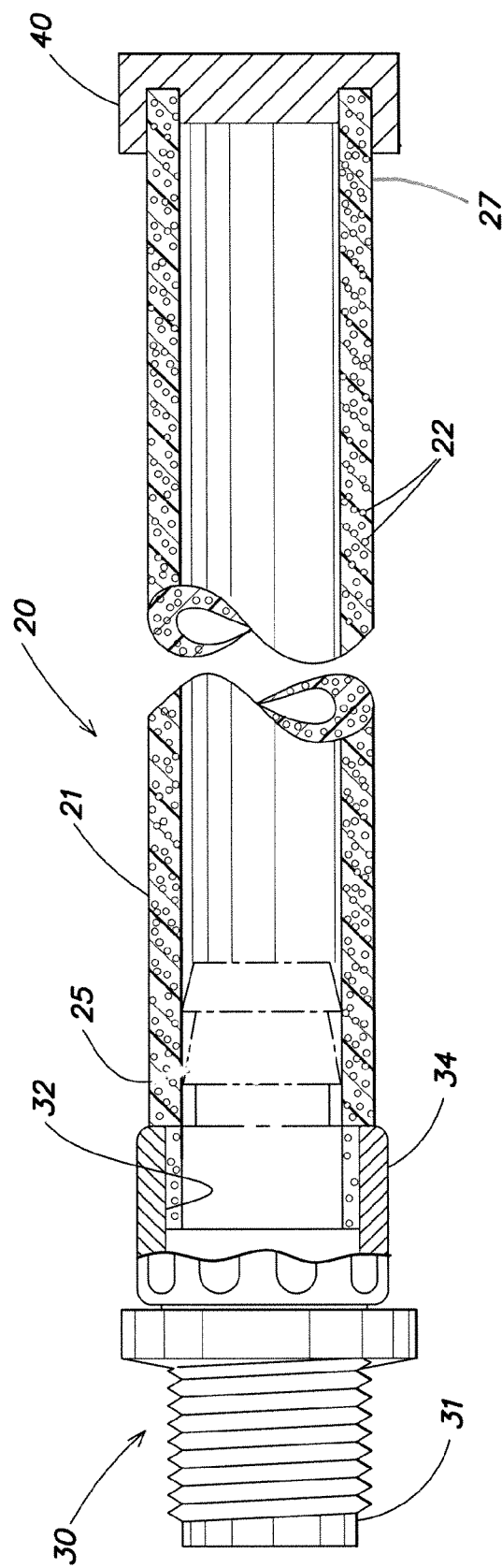
FIG. 3 is a longitudinal cross sectional schematic view of a section of mining leach pipe according to one embodiment of the invention, illustrating the microporous wall structure, a coupling at the input end and a plug at the distal end.

In one embodiment shown schematically in FIG. 3, the porous tubing 21 which forms the mining leach pipe 20 contains a multiplicity of pores 22 which are irregular in size and shape, but which are distributed throughout the entire volume of the tube walls. The size, number, and to some extent the shape of the pores 22 in the tubing can be controlled by the mesh size of the thermoset particles and binder, in the first embodiment, or by the polymer composition and type/amount of blowing agent employed in the second embodiment, and also by the conditions used for extruding the tubing, particularly the extrusion speed. Typically the pores are longitudinally elongated and have their major axis disposed at an acute angle to the longitudinal axis of the tubing, i.e., disposed so that the major axis of the elongated pores does not run normal to the tubing walls. The outside surface of the tubing can be substantially smooth, except for the openings formed by the pores, or it may have a roughened surface created by wrinkles or slight protrusions. Preferably, the inner surface is substantially smooth, providing lower resistance to transmission of the leach solution along the extended pipe length.

Although the tubing is relatively flexible, it is desirable that it not collapse when not filled with solution. Also, it must withstand range handling by heavy equipment during burial, and the weight of ore piled over the tubing. Such strength against collapsing is obtained by making the tubing walls of a suitable thickness, e.g., about 0.05 to 0.5 inch in thickness, although thicker walls can be employed. Generally, it is desirable not to have the wall thickness less than about 0.1 inch in order to provide the pipe with sufficient mechanical strength, and also to obtain proper control of liquid through the tubing walls. Generally, the pipe may have an inner diameter of about 0.375 to 1 inch, although smaller or larger pipe sizes can be made in accordance with the invention.

As shown in FIG. 3, the pipe 20 can be formed with a common circular cross section for optimizing mechanical strength. However other cross sectional shapes are possible, such as an elliptical cross section.

A coupling or fitting 30 is required at one end of the tubing 21 in order that the soaking hose may be connected to a source of water under pressure. A variety of source feeds and coupling devices can be employed. In one embodiment, a tubular supply line about 8 inches in diameter supplies leaching solution to a plurality of microporous leach pipes, which branch off from the supply line at regular or irregular intervals. The supply line can be, for example, high density PE or PVC. Holes may be drilled into the supply line at intervals, and a compression fitting inserted into each hole, for attachment of a porous pipe branch. In one example, the compression fitting 30 has an externally threaded front end 31 which is screwed into a hole in the supply line or other source of leaching solution; a nut seals the connection. A second end 34 of the fitting has a barbed nipple which slides inside a proximal (input) end 25 of the porous tubing 21 and a compression nut 32 is screwed to pinch the tubing against the fitting in liquid-tight communication.

In order to hold water within the pipe under pressure so that it will be forced through the pores 21, it is necessary to provide some closure or plug cap 40 at the distal end 27 of the pipe. Alternatively, this closing can be accomplished by forming a closed distal tip on the tube, e.g., by folding together the walls of the tubing and wrapping a wire to hold the end closed. Alternatively, the distal end of the porous tubing may be connected to another supply line or looped back to connect to the same supply line; in this embodiment the porous pipe is pressurized from both ends and there is no closed distal end.

Figure 4:
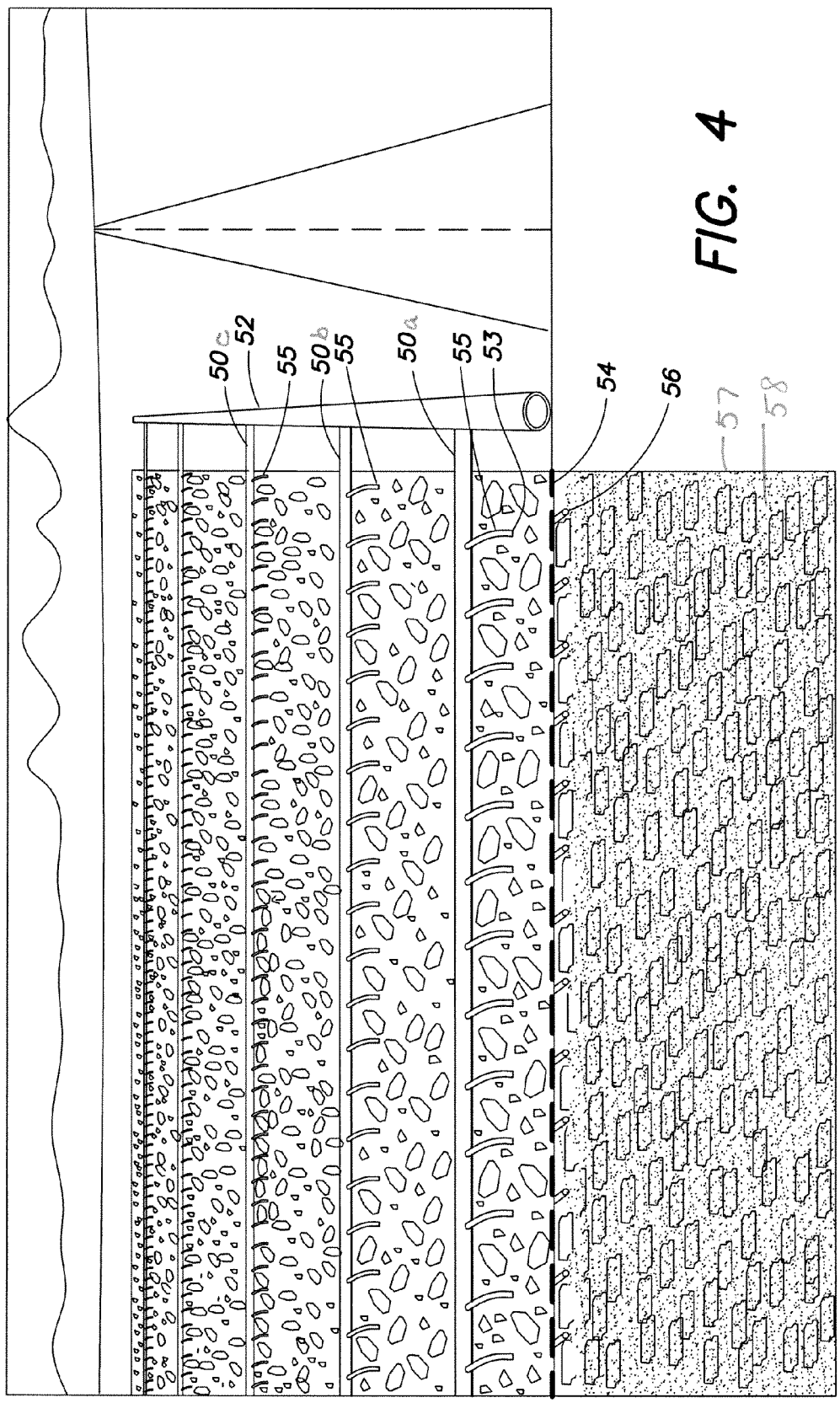
FIG. 4 is a schematic illustration, partially in cross section, of one embodiment of the invention showing main and secondary delivery pipe lines on the surface of a mining ore pile, and sections of the microporous leach pipe branching from the secondary delivery pipes at periodic intervals across the pile, e.g., 2 to 3 feet intervals, the porous pipe being buried beneath the surface of the pile.

FIG. 4 illustrates one embodiment of the invention wherein a main source or feeder pipe 52 supplies a plurality of secondary feeder pipes 50a, 50b, 50c branching off at extended intervals (e.g, 150 feet) from the main feeder pipe 52. In this example, a plurality of porous of leach pipes 55 (e.g., each about 150 feet in length) branch off from each secondary feeder pipe 50 at intervals of e.g., 2 feet. The feeder pipes 52 and 50 are made of high density polyethylene (HDPE) with heat welded butt joints, the main feeder pipe 52 having e.g., a 12 inch outer diameter OD and the secondary feeder pipes 50 each having e.g., an 8 inch OD. The porous leach pipe 55 is a crumb rubber/PE composite of about 66 weight percent rubber and about 34 weight percent LDPE, and has a ⅝ inch ID and 0.115 inch wall thickness. The relative internal diameters of the feeder pipe and branching porous leach pipes, and the relative lengths and the number of branching points, will vary based upon the particular application. As shown here, the leach solution may be supplied to a main trunk line (e.g., 12 inch OD) which then splits and feeds multiple secondary feed lines each having a smaller diameter (e.g., 8 inch OD) to maintain pressure along the length of the supply line.

FIG. 4 shows in the foreground (delineated by dashed line 54) a cross section down through the ore pile 57. Each porous leach pipe 55 extending from feeder pipe 50a is buried near (e.g, within 1-3 feet) its branch point; a cross section through each buried leach pipe 55 is shown at 56, beneath the surface 54 of the pile. The leach solution 58 which has seeped from the plurality of leach pipes 55 along the length of feeder pipe 50a has substantially uniformly wetted the ore across the pile 58, as shown by the even shading in the foreground of FIG. 4.

One typically seeks to avoid turbulent flow in the porous leach pipes, thus utilizing a lower input pressure to hydrologically pressurize the porous pipe before it starts seeping. In other words, the leaching solution travels from the input end (connected to the delivery pipe) to its terminal end in order to pressurize the leaching solution in the porous pipe. There will then be seepage of the leaching solution along the length of the pressurized porous pipe, even with the pressure drop experienced along the pipe length, as long as the pipe remains pressurized. For example, with an input pressure of leaching solution of about 10 psi, a ⅝ inch ID porous pipe may experience a 2 to 3 psi pressure drop per 100 feet of porous pipe. In another example, with an input pressure of 40 to 45 psi, the pressure drop may be 8 to 12 psi per 100 feet of porous pipe. With a 15 psi input pressure, and a 200 foot length porous pipe, the pressure may ultimately drop to 3 psi at a terminal end of the pipe, but still provide sufficient pressurization to perform (provide uniform seeping) along the length of the pipe. Generally, the longer the run of porous pipe, the lower the flow needs to be, i.e., so that the leaching solution does not rapidly seep out at the initial portion of the pipe. By way of example, for a 300 foot length of porous pipe, the delivery rate may be 0.5 gallons per minute per 100 feet. With a much shorter porous pipe length of 100 feet, the delivery rate may be 1 gallon per minute per 100 feet. Those skilled in the art can determine an appropriate balance of parameters for a particular application.

Figure 5:
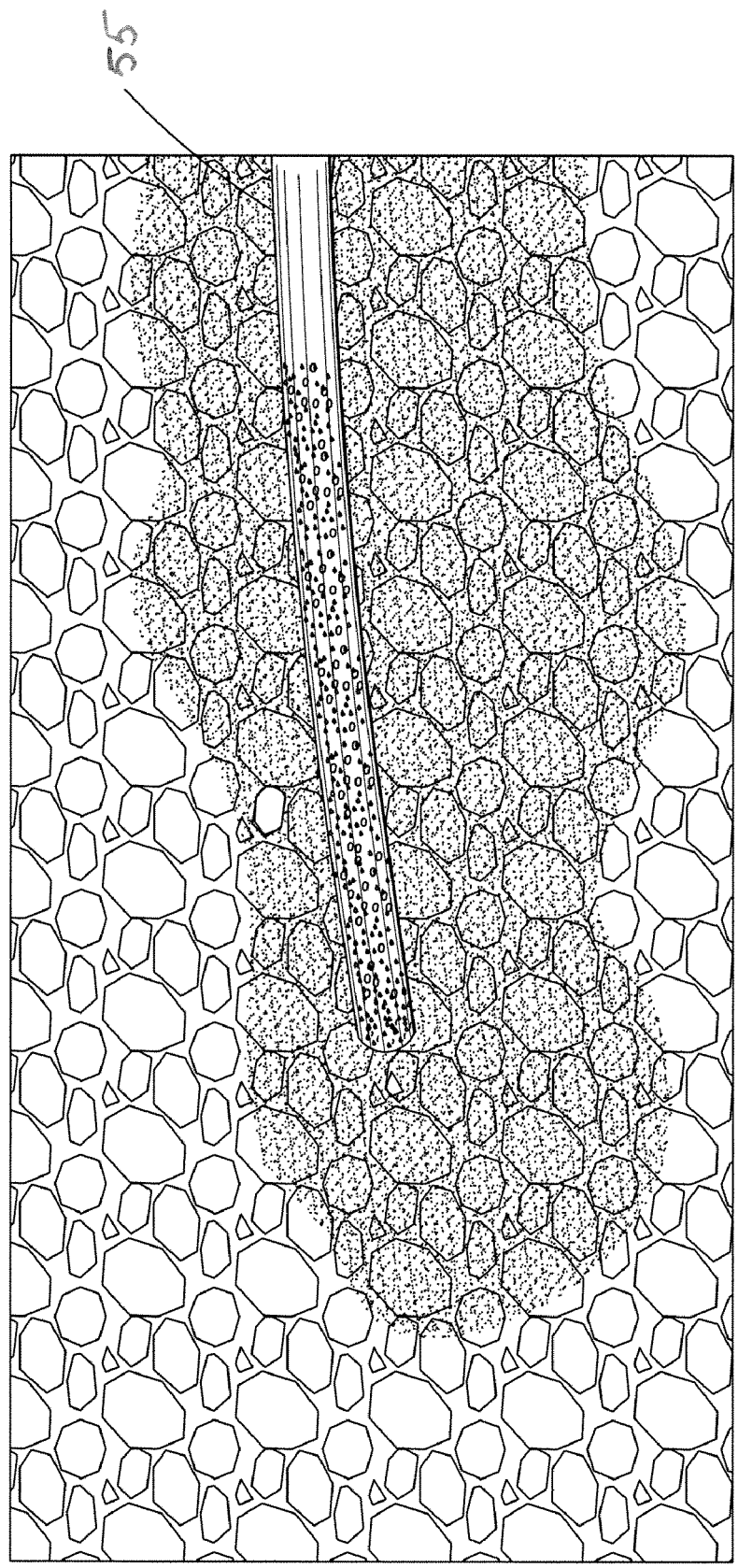
FIG. 5 illustrates a section of the microporous leach pipe of FIG. 4 at the point of burial, showing how the leaching solution seeps through and wets the ore around the pipe.

FIG. 5 is a close-up view of one of the porous pipe branches 55 of FIG. 4, at the point near where it enters (is buried under) the ore pile. The leaching solution has seeped through and wet the ore in an area adjacent the pipe, and particles of ore and soil (clay) are shown clinging to the pipe. However, there is no concentrated dripping, pooling or channeling as encountered with the prior art drip emitters. Instead, the slow seepage provides a more uniform wetting across the pile for more efficient leaching of metal from the pile.

As used herein, the leaching of "metal" is meant to include leaching of metallic compounds, e.g., metals in their oxide form, as well as metals in their pure metallic state. Some metals exist in nature only in their oxide form and further refining operations are required to reduce them to their pure metallic state, after they have been leached/separated from the ore.

While specific embodiments of the present invention have been shown and described, it will be apparent that many modifications can be made thereto without departing from the scope of the invention. Accordingly, the invention is not limited by the foregoing description.

The invention claimed is:

1. A method of leaching metal from a pile of mining ore, comprising:
    locating a length of leach pipe lengthwise across the pile and below the surface of the pile;
    supplying a leach solution to an inlet end of the pipe to pressurize the pipe with the leach solution; and
    the leach pipe comprising a flexible microporous tubular wall of select length providing a substantially continuous and consistent delivery rate of the leach solution along such length as the solution seeps through the microporous wall of the pressurized pipe.

2. The method of claim 1, wherein the microporous wall has a pore size in a range of from 0.001 to 0.004 inch.

3. The method of claim 1, wherein the length of the microporous wall is at least 100 feet.

4. The method of claim 1, wherein the microporous wall has a wall thickness of at least 0.05 inch.

5. The method of claim 1, wherein the microporous wall has an inner diameter of at least 0.25 inch.

6. The method of claim 1, wherein the wall comprises a wall of rubber or plastic material having a porous sponge-like structure with a multiplicity of interconnected irregular shaped pores such that the leach solution under pressure in the pipe will seep through the wall at a rate of from 0.5 to 2.0 gallons per 100 feet per minute.

7. The method of claim 1, wherein the leach solution comprises sodium cyanide, potassium cyanide or sulphuric acid and includes a pH buffer.

8. The method of claim 1, wherein the delivery rate is at least 0.5 gallons per 100 feet per minute.

9. The method of claim 1, wherein the delivery rate is at least 0.005 gallons per foot per minute.

10. The method of claim 9, wherein a pressure is at least 8 psi at the inlet end.

11. The method of claim 1, wherein a pressure drop along the length is from 10-60% per 100 feet.

12. The method of claim 1, wherein the leach solution is delivered for at least 45 days while maintaining a delivery rate of at least 0.5 gallons per 100 feet per minute.

13. The method of claim 1, wherein the metal comprises at least one of gold, copper and chromium.

14. The method of claim 1, wherein the wall comprises thermoset polymer particles and a thermoplastic binder.

15. The method of claim 14, wherein the particles comprise rubber.

16. The method of claim 15, wherein the rubber particles comprise at least 50 weight percent of the pipe.

17. The method of claim 16, wherein the binder comprises an ethylene polymer.

18. The methods of claim 15, wherein the rubber particles have a fineness of about 5 to 200 mesh.

19. The method of claim 1, wherein the solution delivery rate varies by no greater than 10% per two foot section of a 100 foot microporous wall length.

20. The method of claim 1, wherein the microporous wall has a pore size in a range of from 0.001 to 0.004 inch, a wall thickness of from 0.05 to 0.5 inch, an inner diameter of from 0.25 to 1 inch, and a length of at least 100 feet.

* * * * *